(12) United States Patent
Cabral et al.

(10) Patent No.: US 11,922,015 B2
(45) Date of Patent: *Mar. 5, 2024

(54) GENERATING RECOVERED DATA IN A STORAGE NETWORK

(71) Applicant: Pure Storage, Inc., Mountain View, CA (US)

(72) Inventors: Bruno H. Cabral, Chicago, IL (US); Wesley B. Leggette, Chicago, IL (US)

(73) Assignee: Pure Storage, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/045,694

(22) Filed: Oct. 11, 2022

(65) Prior Publication Data

US 2023/0056072 A1 Feb. 23, 2023

Related U.S. Application Data

(63) Continuation of application No. 17/446,841, filed on Sep. 3, 2021, now Pat. No. 11,513,685, which is a
(Continued)

(51) Int. Cl.
*G06F 3/06* (2006.01)
*G06F 11/10* (2006.01)
(Continued)

(52) U.S. Cl.
CPC .......... *G06F 3/0604* (2013.01); *G06F 3/0619* (2013.01); *G06F 3/0644* (2013.01);
(Continued)

(58) Field of Classification Search
CPC .... G06F 3/0604; G06F 3/0619; G06F 3/0644; G06F 3/0659; G06F 3/0661; G06F 3/067;
(Continued)

(56) References Cited

U.S. PATENT DOCUMENTS 4,092,732 A 5/1978 Ouchi
5,454,101 A 9/1995 Mackay
(Continued)

OTHER PUBLICATIONS

Chung; An Automatic Data Segmentation Method for 3D Measured Data Points; National Taiwan University; pp. 1-8; 1998.
(Continued)

*Primary Examiner* — Shelly A Chase
(74) *Attorney, Agent, or Firm* — Garlick & Markison; Timothy W. Markison; Bruce E. Stuckman

(57) ABSTRACT

A storage network operates by: issuing a read threshold number of read slice requests to storage units of a set of storage units, where the read threshold number of read slice requests identifies a read threshold number of encoded slices of a set of encoded slices corresponding to a data segment; when one or more other encoded data slices of the read threshold number of encoded slices is not received within a time threshold, facilitating receiving a decode threshold number of encoded slices of the set of encoded slices; decoding the decode threshold number of encoded slices to produce recovered encoded data slices, wherein a number of the recovered encoded data slices corresponds to the read threshold number minus a number of the encoded slices received within the time threshold; and outputting the recovered encoded data slices and the encoded slices of the read threshold number of encoded slices received within the time threshold.

20 Claims, 9 Drawing Sheets

Related U.S. Application Data continuation of application No. 16/850,193, filed on Apr. 16, 2020, now Pat. No. 11,144,204, which is a continuation of application No. 16/165,608, filed on Oct. 19, 2018, now Pat. No. 10,635,312, which is a continuation-in-part of application No. 15/841,759, filed on Dec. 14, 2017, now Pat. No. 10,140,182, which is a continuation-in-part of application No. 15/450,470, filed on Mar. 6, 2017, now Pat. No. 9,891,829, which is a continuation of application No. 14/589,639, filed on Jan. 5, 2015, now Pat. No. 9,665,429.

(60) Provisional application No. 61/944,722, filed on Feb. 26, 2014.

(51) Int. Cl.
| | |
|---|---|
| *G06F 21/62* | (2013.01) |
| *G06F 21/64* | (2013.01) |
| *H03M 7/30* | (2006.01) |
| *H04L 1/00* | (2006.01) |
| *H04L 9/08* | (2006.01) |
| *H04L 9/40* | (2022.01) |
| *H04L 67/06* | (2022.01) |
| *H04L 67/10* | (2022.01) |
| *H04L 67/1097* | (2022.01) |
| *H04L 67/565* | (2022.01) |
| *H03M 13/00* | (2006.01) |
| *H03M 13/15* | (2006.01) |

(52) U.S. Cl.
CPC .......... *G06F 3/0659* (2013.01); *G06F 3/0661* (2013.01); *G06F 3/067* (2013.01); *G06F 11/1076* (2013.01); *G06F 11/1092* (2013.01); *G06F 21/62* (2013.01); *G06F 21/64* (2013.01); *H03M 7/6011* (2013.01); *H04L 1/00* (2013.01); *H04L 1/0045* (2013.01); *H04L 1/0057* (2013.01); *H04L 1/0076* (2013.01); *H04L 9/085* (2013.01); *H04L 9/0894* (2013.01); *H04L 63/10* (2013.01); *H04L 63/101* (2013.01); *H04L 63/102* (2013.01); *H04L 67/06* (2013.01); *H04L 67/10* (2013.01); *H04L 67/1097* (2013.01); *H04L 67/565* (2022.05); *G06F 2211/1028* (2013.01); *G06F 2212/254* (2013.01); *H03M 13/1515* (2013.01); *H03M 13/616* (2013.01); *H04L 63/12* (2013.01); *H04L 2209/30* (2013.01); *H04L 2209/34* (2013.01); *H04L 2209/608* (2013.01)

(58) Field of Classification Search
CPC .... G06F 11/1076; G06F 11/1092; H04L 1/00; H04L 1/0045; H04L 1/0057; H04L 1/0076; H04L 9/085; H04L 63/10; H04L 63/101; H04L 63/102
See application file for complete search history.

(56) References Cited

U.S. PATENT DOCUMENTS

| | | | |
|---|---|---|---|
| 5,485,474 A | 1/1996 | Rabin | |
| 5,774,643 A | 6/1998 | Lubbers | |
| 5,802,364 A | 9/1998 | Senator | |
| 5,809,285 A | 9/1998 | Hilland | |
| 5,890,156 A | 3/1999 | Rekieta | |
| 5,987,622 A | 11/1999 | Lo Verso | |
| 5,991,414 A | 11/1999 | Garay | |
| 6,012,159 A | 1/2000 | Fischer | |
| 6,058,454 A | 5/2000 | Gerlach | |
| 6,128,277 A | 10/2000 | Bruck | |
| 6,175,571 B1 | 1/2001 | Haddock | |
| 6,192,472 B1 | 2/2001 | Garay | |
| 6,256,688 B1 | 7/2001 | Suetaka | |
| 6,272,658 B1 | 8/2001 | Steele | |
| 6,301,604 B1 | 10/2001 | Nojima | |
| 6,356,949 B1 | 3/2002 | Katsandres | |
| 6,366,995 B1 | 4/2002 | Nikolaevich | |
| 6,374,336 B1 | 4/2002 | Peters | |
| 6,415,373 B1 | 7/2002 | Peters | |
| 6,418,539 B1 | 7/2002 | Walker | |
| 6,449,688 B1 | 9/2002 | Peters | |
| 6,567,948 B2 | 5/2003 | Steele | |
| 6,571,282 B1 | 5/2003 | Bowman-Amuah | |
| 6,609,223 B1 | 8/2003 | Wolfgang | |
| 6,718,361 B1 | 4/2004 | Basani | |
| 6,760,808 B2 | 7/2004 | Peters | |
| 6,785,768 B2 | 8/2004 | Peters | |
| 6,785,783 B2 | 8/2004 | Buckland | |
| 6,826,711 B2 | 11/2004 | Moulton | |
| 6,879,596 B1 | 4/2005 | Dooply | |
| 7,003,688 B1 | 2/2006 | Pittelkow | |
| 7,024,451 B2 | 4/2006 | Jorgenson | |
| 7,024,609 B2 | 4/2006 | Wolfgang | |
| 7,080,101 B1 | 7/2006 | Watson | |
| 7,103,824 B2 | 9/2006 | Halford | |
| 7,103,915 B2 | 9/2006 | Redlich | |
| 7,111,115 B2 | 9/2006 | Peters | |
| 7,140,044 B2 | 11/2006 | Redlich | |
| 7,146,644 B2 | 12/2006 | Redlich | |
| 7,171,493 B2 | 1/2007 | Shu | |
| 7,222,133 B1 | 5/2007 | Raipurkar | |
| 7,240,236 B2 | 7/2007 | Cutts | |
| 7,272,613 B2 | 9/2007 | Sim | |
| 7,636,724 B2 | 12/2009 | De La Torre | |
| 2002/0062422 A1 | 5/2002 | Butterworth | |
| 2002/0166079 A1 | 11/2002 | Ulrich | |
| 2003/0018927 A1 | 1/2003 | Gadir | |
| 2003/0037261 A1 | 2/2003 | Meffert | |
| 2003/0065617 A1 | 4/2003 | Watkins | |
| 2003/0084020 A1 | 5/2003 | Shu | |
| 2004/0024963 A1 | 2/2004 | Talagala | |
| 2004/0122917 A1 | 6/2004 | Menon | |
| 2004/0215998 A1 | 10/2004 | Buxton | |
| 2004/0228493 A1 | 11/2004 | Ma | |
| 2005/0100022 A1 | 5/2005 | Ramprashad | |
| 2005/0114594 A1 | 5/2005 | Corbett | |
| 2005/0125593 A1 | 6/2005 | Karpoff | |
| 2005/0131993 A1 | 6/2005 | Fatula, Jr. | |
| 2005/0132070 A1 | 6/2005 | Redlich | |
| 2005/0144382 A1 | 6/2005 | Schmisseur | |
| 2005/0229069 A1 | 10/2005 | Hassner | |
| 2006/0047907 A1 | 3/2006 | Shiga | |
| 2006/0136448 A1 | 6/2006 | Cialini | |
| 2006/0156059 A1 | 7/2006 | Kitamura | |
| 2006/0224603 A1 | 10/2006 | Correll, Jr. | |
| 2007/0079081 A1 | 4/2007 | Gladwin | |
| 2007/0079082 A1 | 4/2007 | Gladwin | |
| 2007/0079083 A1 | 4/2007 | Gladwin | |
| 2007/0088970 A1 | 4/2007 | Buxton | |
| 2007/0174192 A1 | 7/2007 | Gladwin | |
| 2007/0214285 A1 | 9/2007 | Au | |
| 2007/0234110 A1 | 10/2007 | Soran | |
| 2007/0283167 A1 | 12/2007 | Venters, III | |
| 2009/0094251 A1 | 4/2009 | Gladwin | |
| 2009/0094318 A1 | 4/2009 | Gladwin | |
| 2009/0144516 A1 | 6/2009 | Sandorfi | |
| 2010/0023524 A1 | 1/2010 | Gladwin | |
| 2011/0072321 A1 | 3/2011 | Dhuse | |
| 2011/0214011 A1 | 9/2011 | Grube et al. | |
| 2011/0225362 A1 | 9/2011 | Leggette | |
| 2011/0289383 A1* | 11/2011 | Dhuse .................. | H04L 9/0894 714/763 |
| 2011/0311051 A1 | 12/2011 | Resch | |
| 2012/0054456 A1 | 3/2012 | Grube | |
| 2012/0102316 A1 | 4/2012 | Resch | |
| 2012/0110390 A1 | 5/2012 | Grube | |
| 2012/0137091 A1 | 5/2012 | Grube et al. | |

(56) References Cited

U.S. PATENT DOCUMENTS

| | | |
|---|---|---|
| 2013/0086450 A1 | 4/2013 | Grube |
| 2013/0304745 A1 | 11/2013 | Dhuse |
| 2013/0304746 A1 | 11/2013 | Dhuse |
| 2014/0101116 A1 | 4/2014 | Alnafoosi |
| 2014/0122968 A1* | 5/2014 | Kazi ................ H03M 13/616 714/763 |
| 2014/0351659 A1 | 11/2014 | Dhuse |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: an Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 1511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

WILDI; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Working Group; RFC 4518; Jun. 2006; pp. 1-14.

Zeilenga; Lightweight Directory Access Protocol (LDAP): String Representation of Distinguished Names; IETF Network Working Group; RFC 4514; Jun. 2006; pp. 1-15.

Zeilenga; Lightweight Directory Access Protocol (LDAP): Technical Specification Road Map; IETF Network Working Group; RFC 4510; Jun. 2006; pp. 1-8.

* cited by examiner distributed, or dispersed, storage network (DSN) 10

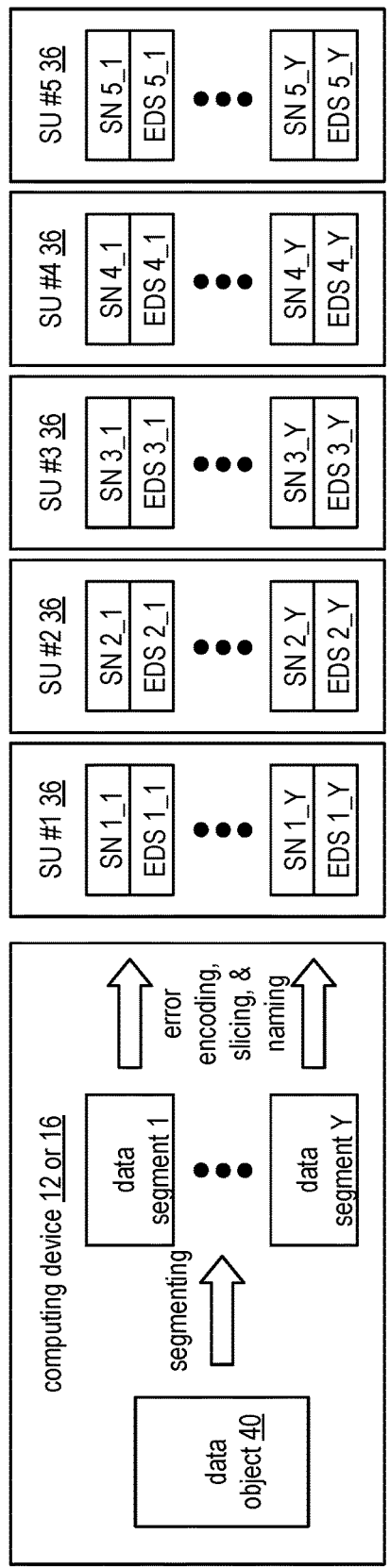
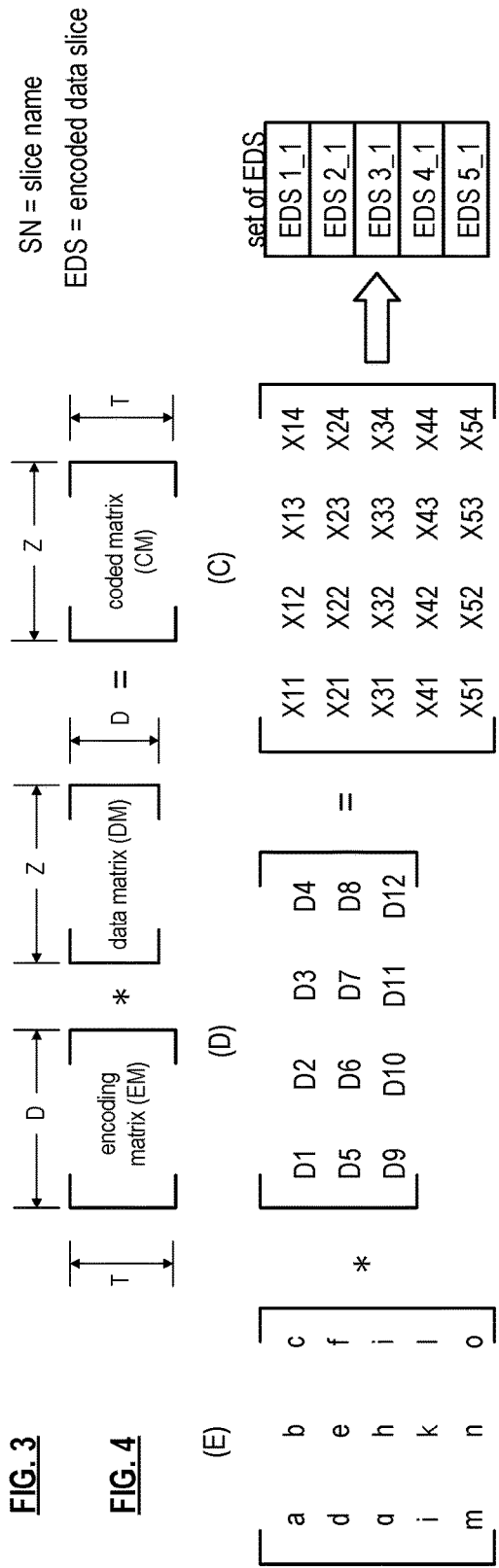
FIG. 3
FIG. 4
FIG. 5
FIG. 6

GENERATING RECOVERED DATA IN A STORAGE NETWORK

CROSS-REFERENCE TO RELATED APPLICATIONS

The present U.S. Utility Patent application claims priority pursuant to 35 U.S.C. § 120 as a continuation of U.S. Utility application Ser. No. 17/446,841, entitled "RETRIEVING DATA IN A STORAGE NETWORK", filed Sep. 3, 2021, which is a continuation of U.S. Utility application Ser. No. 16/850,193, entitled "RECOVERING DATA IN A STORAGE NETWORK", filed Apr. 16, 2020, issued as U.S. Pat. No. 11,144,204 on 10/12/2021, which is a continuation of U.S. Utility application Ser. No. 16/165,608, entitled "RECOVERING DATA IN A DISPERSED STORAGE NETWORK", filed Oct. 19, 2018, issued as U.S. Pat. No. 10,635,312 on 4/28/2020, which is a continuation-in-part of U.S. Utility application Ser. No. 15/841,759, entitled "MODIFYING ALLOCATION OF STORAGE RESOURCES IN A DISPERSED STORAGE NETWORK", filed Dec. 14, 2017, issued as U.S. Pat. No. 10,140,182 on Nov. 27, 2018, which is a continuation-in-part of U.S. Utility application Ser. No. 15/450,470, entitled "STORAGE OF DATA WITH VERIFICATION IN A DISPERSED STORAGE NETWORK", filed Mar. 6, 2017, issued as U.S. Pat. No. 9,891,829 on Feb. 13, 2018, which claims priority pursuant to 35 U.S.C. § 120 as a continuation of U.S. Utility application Ser. No. 14/589,639, entitled "STORAGE OF DATA WITH VERIFICATION IN A DISPERSED STORAGE NETWORK", filed Jan. 5, 2015, issued as U.S. Pat. No. 9,665,429 on May 30, 2017, which claims priority pursuant to 35 U.S.C. § 119(e) to U.S. Provisional Application No. 61/944,722, entitled "SELECTING RESOURCES OF A DISPERSED STORAGE NETWORK", filed Feb. 26, 2014, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

DETAILED DESCRIPTION OF THE INVENTION

Figure 1:
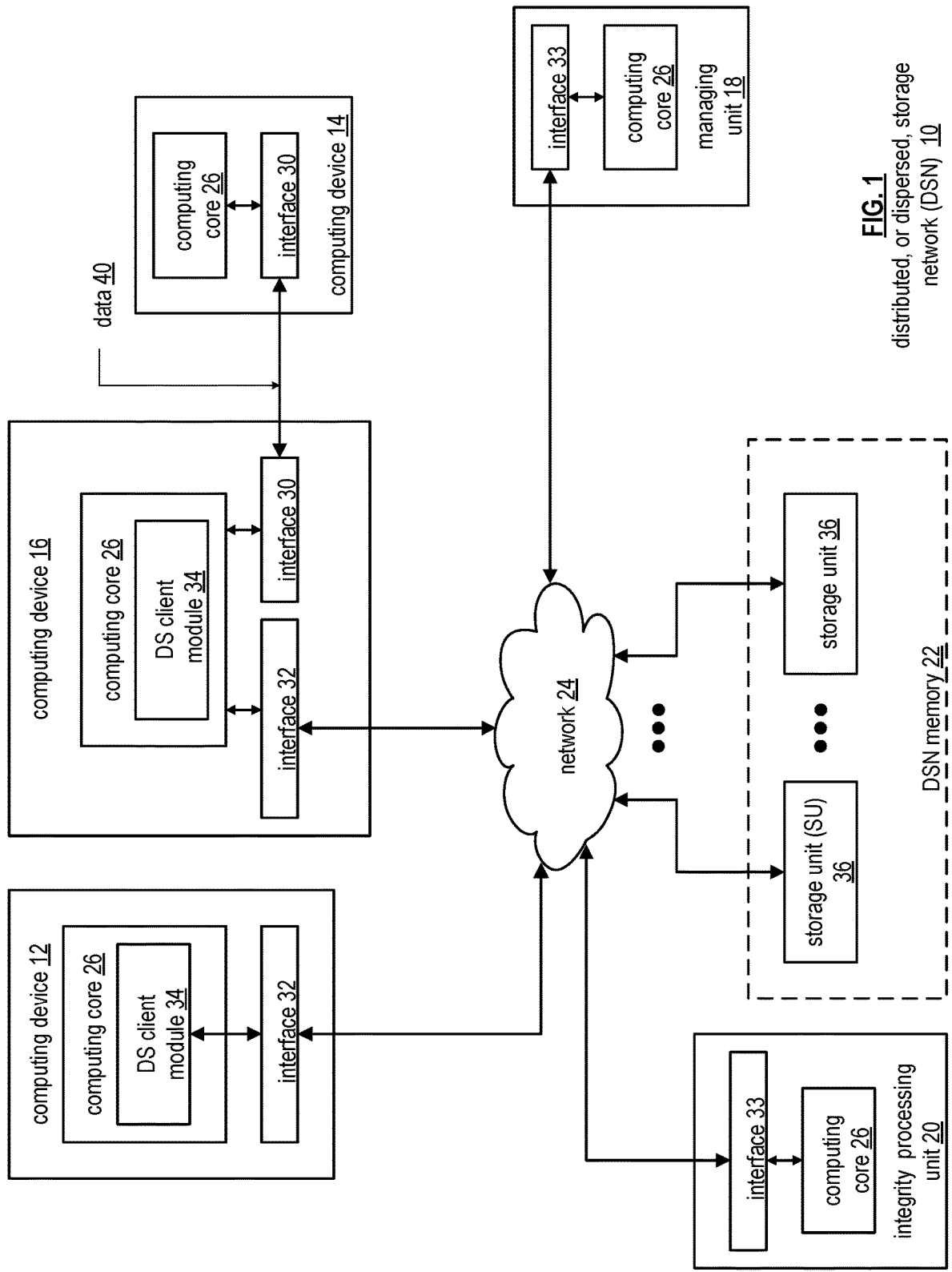
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
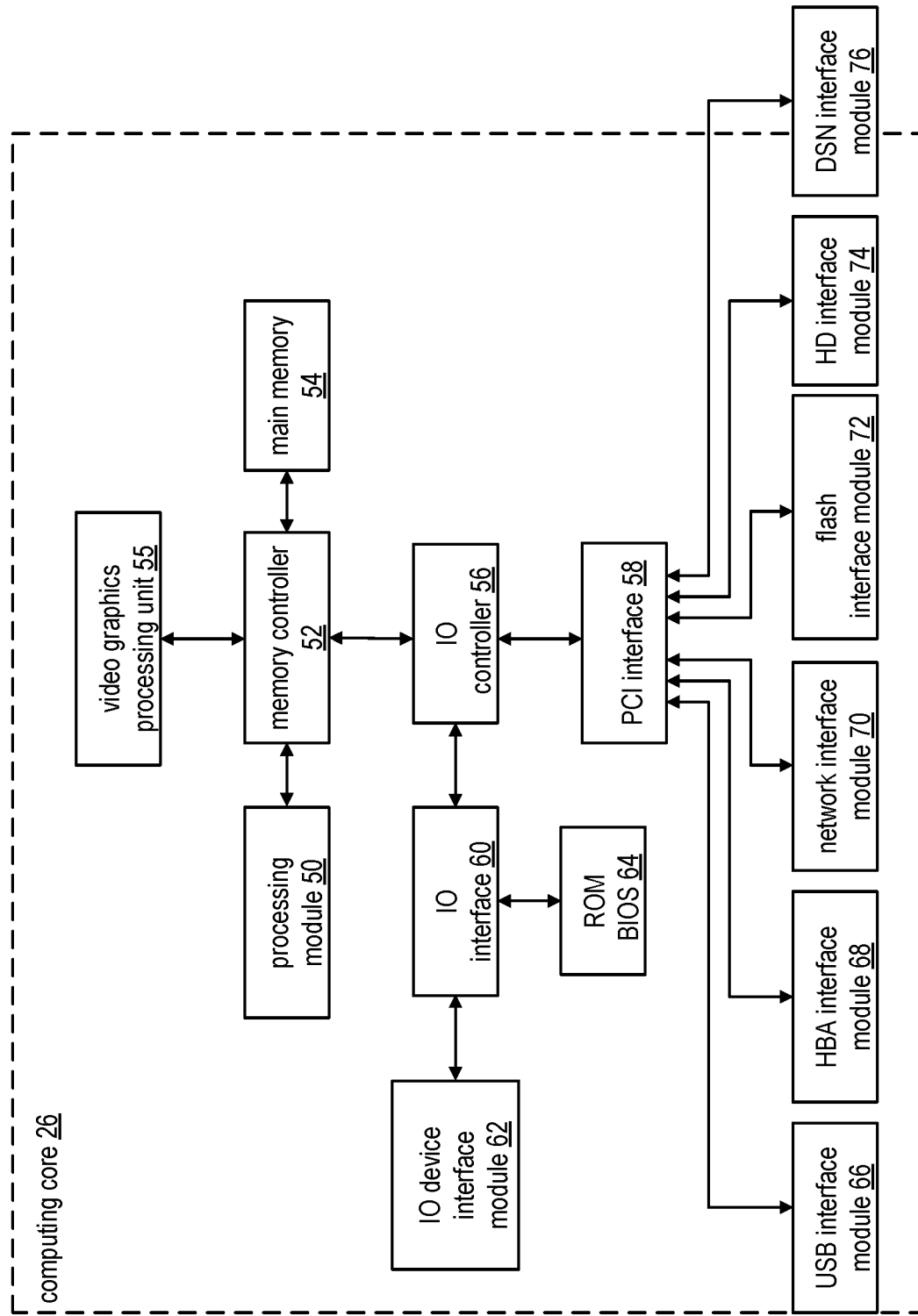
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

In various embodiments, each of the storage units operates as a distributed storage and task (DST) execution unit, and is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. Hereafter, a storage unit may be interchangeably referred to as a dispersed storage and task (DST) execution unit and a set of storage units may be interchangeably referred to as a set of DST execution units.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each managing unit 18 and the integrity processing unit 20 may be separate computing devices, may be a common computing device, and/or may be integrated into one or more of the computing devices 12-16 and/or into one or more of the storage units 36. In various embodiments, computing devices 12-16 can include user devices and/or can be utilized by a requesting entity generating access requests, which can include requests to read or write data to storage units in the DSN.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. Here, the computing device stores data object 40, which can include a file (e.g., text, video, audio, etc.), or other data arrangement. The dispersed storage error encoding parameters include an encoding function (e.g., information dispersal algorithm (IDA), Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides data object 40 into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
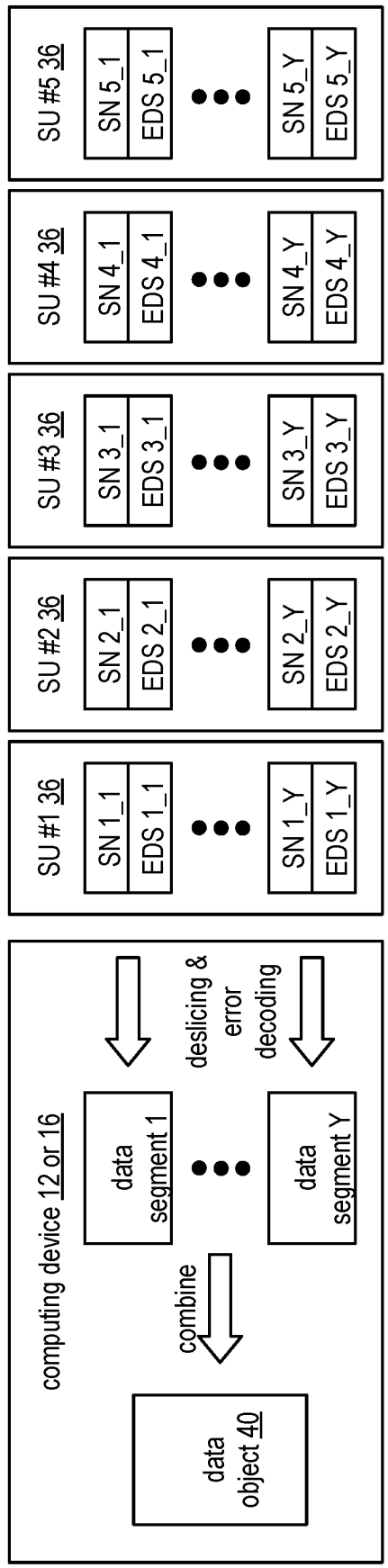
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9A:
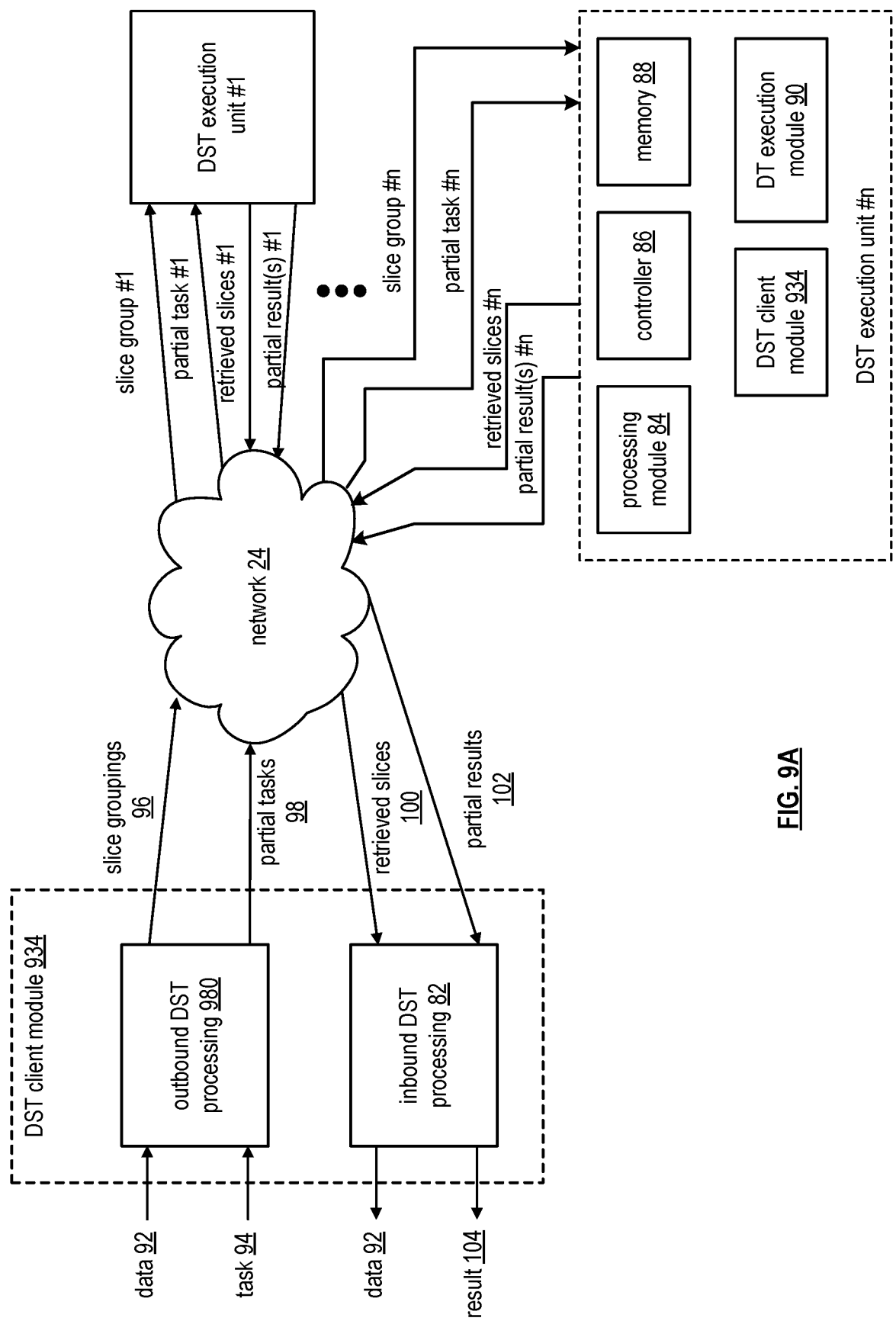
FIG. 9A is a diagram of an example of a distributed storage and task processing in accordance with the present invention.

FIG. 9A is a diagram of an example of the distributed computing system performing a distributed storage and task processing operation in accordance with various embodiments. The distributed computing system includes a DST (distributed storage and/or task) client module 934 (which may be in user device 14 and/or in computing device 16 of FIG. 1), a network 24, a plurality of DST execution units 1-n that includes two or more execution units, which can be implemented by utilizing the storage units 36 of FIG. 1 and which form at least a portion of a DST module, a DST managing module (not shown), and/or a DST integrity verification module (not shown). The DST client module 934 can be implemented by utilizing the DS client module 34 of FIG. 1. The DST client module 934 includes an outbound DST processing section 980 and an inbound DST processing section 82. Each of the DST execution units 1-n includes a controller 86, a processing module 84, memory 88, a DT (distributed task) execution module 90, and a DST client module 934.

In an example of operation, the DST client module 934 receives data 92 and one or more tasks 94 to be performed upon the data 92. The data 92 may be of any size and of any content, where, due to the size (e.g., greater than a few Terabytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terabytes).

Within the DST client module 934, the outbound DST processing section 980 receives the data 92 and the task(s) 94. The outbound DST processing section 980 processes the data 92 to produce slice groupings 96. As an example of such processing, the outbound DST processing section 980 partitions the data 92 into a plurality of data partitions. For each data partition, the outbound DST processing section 980 dispersed storage (DS) error encodes the data partition to produce encoded data slices and groups the encoded data slices into a slice grouping 96. In addition, the outbound DST processing section 980 partitions the task 94 into partial tasks 98, where the number of partial tasks 98 may correspond to the number of slice groupings 96.

The outbound DST processing section 980 then sends, via the network 24, the slice groupings 96 and the partial tasks 98 to the DST execution units 1-n of a DST module. For example, the outbound DST processing section 980 sends slice group 1 and partial task 1 to DST execution unit 1. As another example, the outbound DST processing section 980 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 934. The inbound DST processing section 82 processes the received partial results 102 to produce a result 104. Continuing with the specific example of the preceding paragraph, the inbound DST processing section 82 combines the phrase count from each of the DST execution units to produce a total phrase count. In addition, the inbound DST processing section 82 combines the 'where the phrase was found' information from each of the DST execution units within their respective data partitions to produce 'where the phrase was found' information for the series of digital books.

In another example of operation, the DST client module 934 requests retrieval of stored data within the memory of the DST execution units (e.g., memory of the DSTN module). In this example, the task 94 is retrieve data stored in the memory of the DSTN module. Accordingly, the outbound DST processing section 980 converts the task 94 into a plurality of partial tasks 98 and sends the partial tasks 98 to the respective DST execution units 1-n.

In response to the partial task 98 of retrieving stored data, a DST execution unit identifies the corresponding encoded data slices 100 and retrieves them. For example, DST execution unit #1 receives partial task #1 and retrieves, in response thereto, retrieved slices #1. The DST execution units send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 9B:
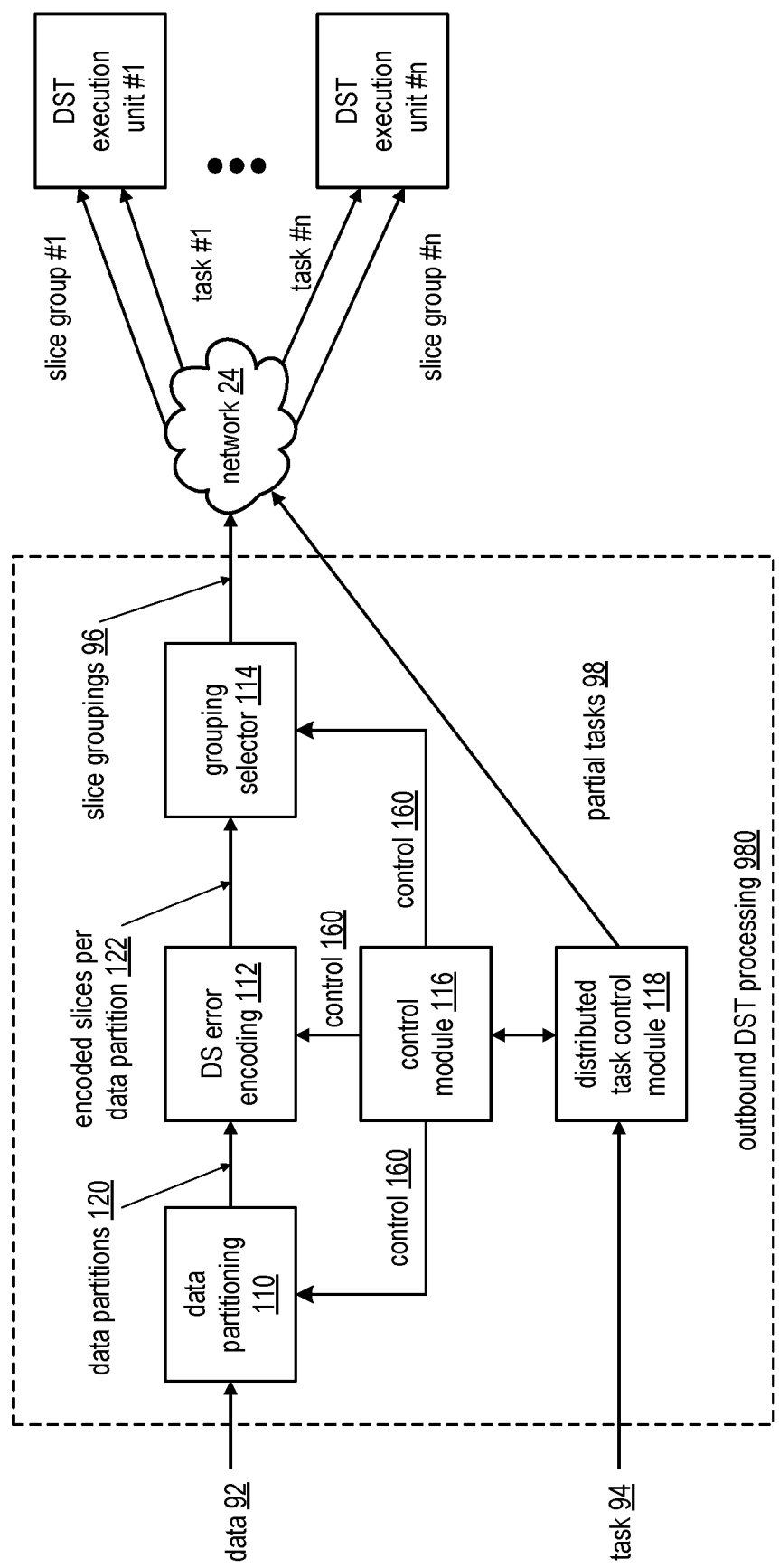
FIG. 9B is a schematic block diagram of an embodiment of an outbound distributed storage and/or task (DST) processing in accordance with the present invention.

FIG. 9B is a schematic block diagram of an embodiment of an outbound distributed storage and/or task (DST) processing section 980 of a DST client module 934 of FIG. 9A, coupled to a DSN memory 22 of a FIG. 1 (e.g., a plurality of n DST execution units) via a network 24. The plurality of DST execution units can be implemented by utilizing the storage units of FIG. 1. The outbound DST processing section 980 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units (e.g., processing resources, availability of processing recourses, etc.), and/or as may be inputted by a user, system administrator, or other operator (human or automated). For example, the data partitioning module 110 partitions the data 92 (e.g., 100 Terabytes) into 100,000 data segments, each being 1 Gigabyte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices of a data partition into a set of slice groupings 96. The number of slice groupings corresponds to the number of DST execution units identified for a particular task 94. For example, if five DST execution units are identified for the particular task 94, the grouping selector module groups the encoded slices of a data partition into five slice groupings 96. The grouping selector module 114 outputs the slice groupings 96 to the corresponding DST execution units via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phrase and a second set of partial tasks for finding and counting the second phrase. The distributed task control module 118 sends respective first and/or second partial tasks 98 to each DST execution unit.

Figure 9C:
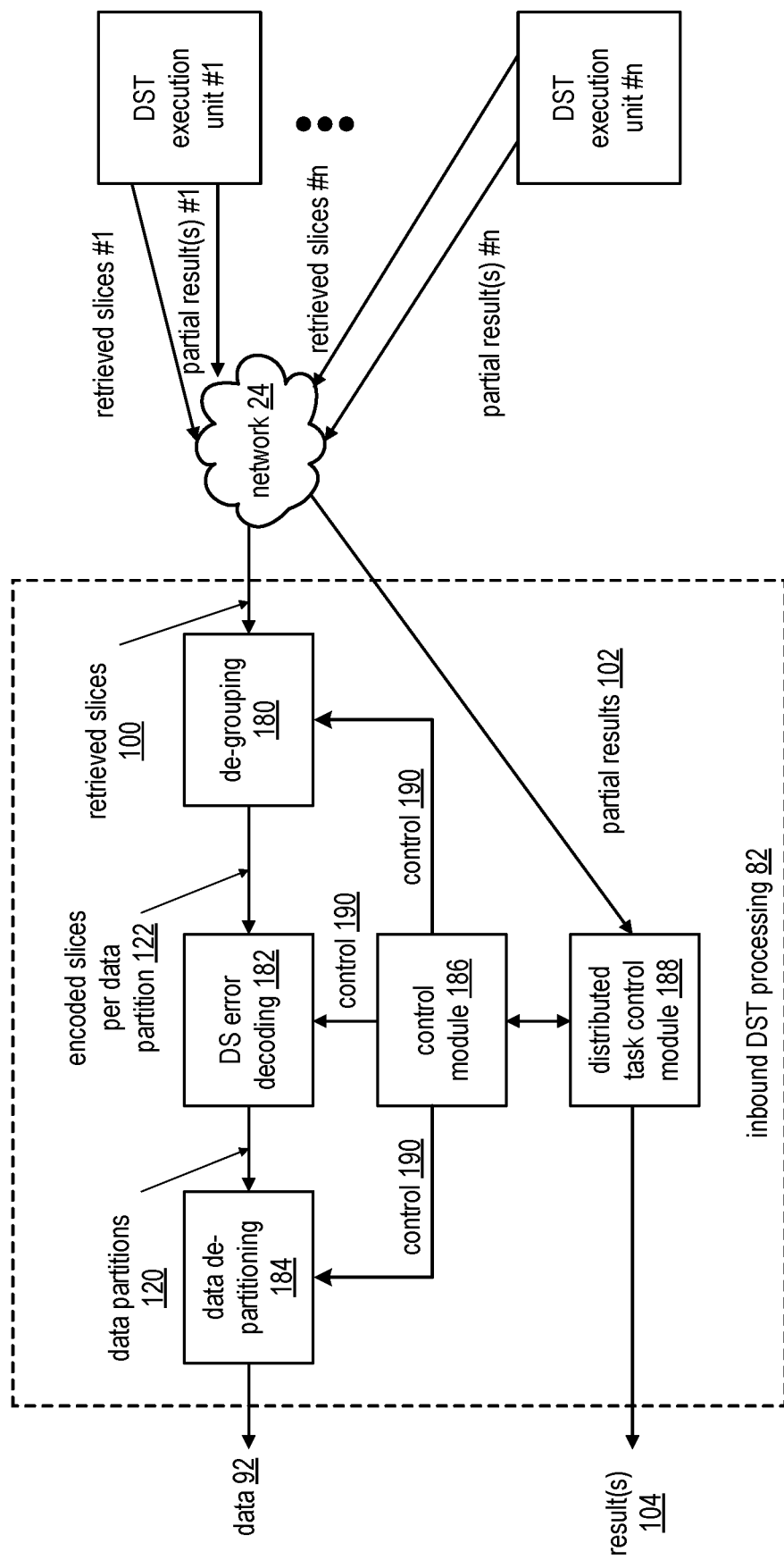
FIG. 9C is a schematic block diagram of an embodiment of an inbound distributed storage and/or task (DST) processing in accordance with the present invention.

FIG. 9C is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieve slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 10:
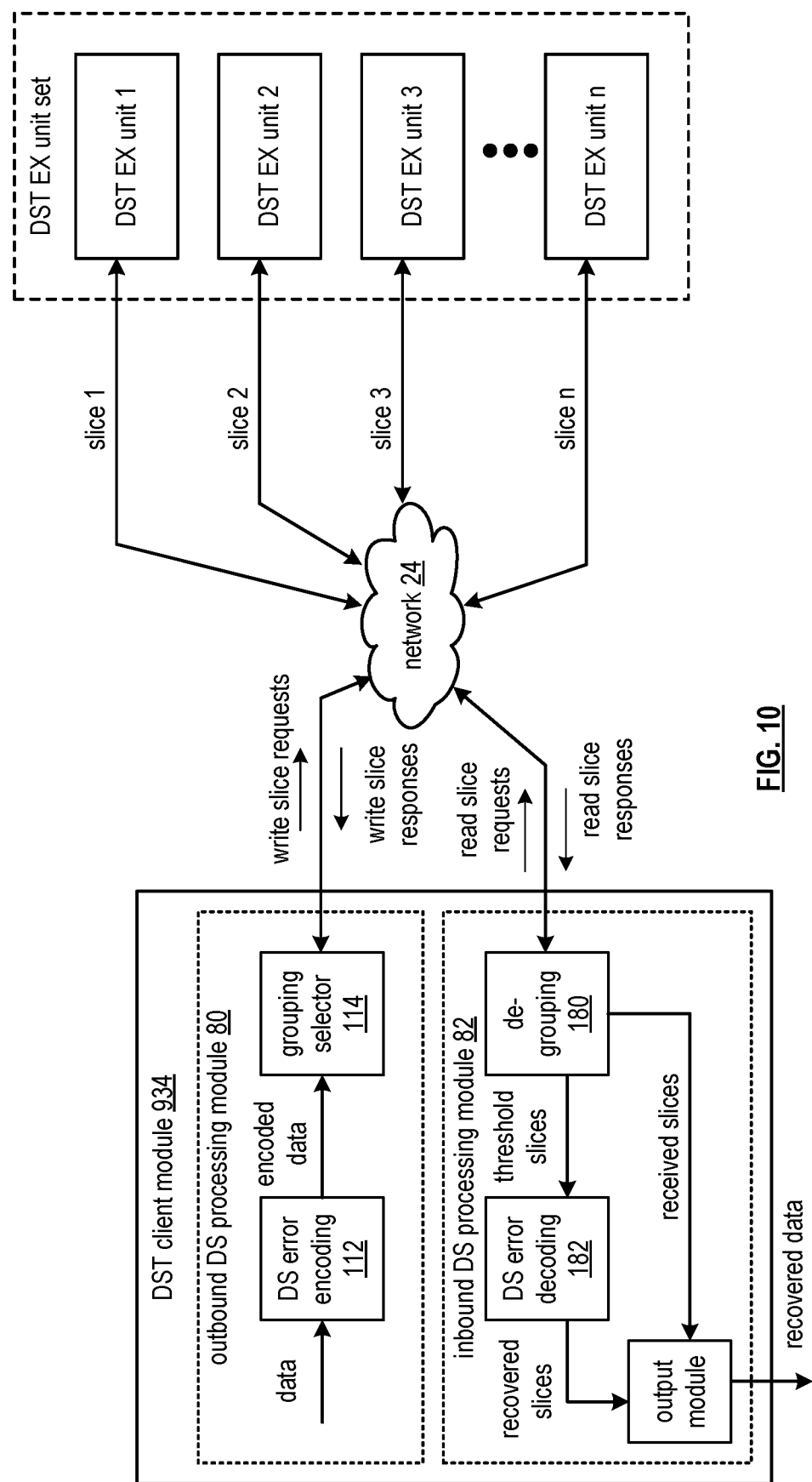
FIG. 10 is a schematic block diagram of an embodiment of a dispersed or distributed storage network (DSN) in accordance with the present invention.

FIG. 10 is a schematic block diagram of another embodiment of a dispersed storage network (DSN) that includes the distribute storage and task (DST) client module 934 of FIG. 9A, the network 24 of FIG. 1, and a DST execution unit set. The DST client module can be implemented utilizing the DS client module 34 of FIG. 1. The DST execution unit set includes a set of DST execution units 1-n. Each DST execution unit may be implemented using the storage unit 36 of FIG. 1. The DST client module 34 includes the outbound DST processing section 980 of FIG. 9A, and the inbound DST processing section 82 of FIG. 9A. Hereafter, the outbound DST processing section 980 may be referred to interchangeably as the outbound DS processing 980 and the inbound DST processing section 82 may be referred to interchangeably as the inbound DS processing 82. The outbound DST processing section 980 includes the DS error encoding 112 of FIG. 9B and includes the group selector 114 of FIG. 9B. The inbound DST processing section 82 includes the de-grouping 180 of FIG. 9C, the DS error decoding 182 of FIG. 13, and an output module. The DSN functions to store data and to recover the data to produce recovered data.

The DST client module 934, or other processing system of the DSN, can requests slices for a source of data, for which a threshold number of the slices correspond to contiguous data of the original source. As used herein, these threshold slices are referred to as the "data slices", as opposed to the (width–threshold) other slices which are computed by the dispersal algorithm, which are the code slices. The construction of the data slices means that the concatenation of the data slices in a certain order is identical to the decoded data. The DST client module uses this property to accelerate delivery of the data to the requester by requesting at least a threshold number of slices for the source. The DST client module can favor requesting data slices, and in particular the first few of the threshold number of data slices. For example, the DST client module determine to request the data slices and not to request the code slices. As another example, the DST client module can determine to request a first subset of the threshold number of slices as data slices and a remaining subset of the threshold number of slices as code slices, where the size of the first subset is substantially larger than the remaining subset. As another example, all of the data slices are requested, and some or all of the code slices are also requested. As soon as the first of the threshold data slices is received, the DST client module can begin to stream that data immediately to the requester, as it is identical to the first (1/threshold) of the source data. Any other data slice N can be streamed immediately upon reception, without having to perform IDA decoding, so long as previous data slices N−1 have already been returned in this same manner. The streaming of the data slices can be in accordance with the ordering of slices in conjunction with their ordering in the contiguous data, where no slices are streamed until the first ordered slice is received and transmitted, followed by the second, up until the N data slices that make up the contiguous data, where intermediate slices received by the DST client module out of order are queued locally until the necessary previous ordered slices are received and transmitted.

Upon the reception of at least a threshold number of slices of any kind (data slices or code slices), the DST client module may perform an IDA decoding for any of the slices that have not already been returned. For example, any of the data slices that have not been returned can be recovered by utilizing the threshold number combination of data slices and code slices, for example, by reproducing the corresponding contiguous data of the data source. Alternatively or in addition, this can be accomplished by multiplying only certain rows of the decoding matrix (those corresponding to slices not yet returned to the requester) by the vector containing the threshold number of received slices. Once these slices are recovered, they can be streamed, in order, to the requester which completes the request for that data source.

In an example of operation of the storing of the data, the outbound DST processing section 980 can partition a data object to produce a plurality of data segments, and for each data segment, the DS error encoding 112 can dispersed storage error encode the data segment to produce a set of an information dispersal algorithm (IDA) width number of encoded data slices, where a decode threshold number of encoded data slices of the set of encoded data slices are substantially the same as the data segment. For instance, the DS error encoding 112 matrix multiplies the data segment by an encoding matrix that includes a unity matrix in a first decode threshold number of rows to produce an output matrix that is sliced to produce the set of encoded data slices.

Having produced a plurality of sets of encoded data slices, the group selector 114 can issue, via the network 24, one or more sets of write slice requests to the set of DST execution units 1-n, where the one or more sets of write slice requests includes the plurality of sets of encoded data slices and an associated plurality of sets of slice names. The outbound DST processing section 980 can receive write slice responses from at least some of the DST execution units indicating status (e.g., success, failure) of storing encoded data slices.

In an example of operation of the recovering of the data to produce the recovered data, the inbound DST processing section 82 can select a read threshold number of encoded data slices for retrieval of each set of encoded data slices, where the read threshold number is greater than or equal to the decode threshold number and less than or equal to the IDA width number. For example, the inbound DST processing section 82 selects encoded data slices corresponding to a first decode threshold number of encoded data slices for each set of encoded data slices such that the decode threshold number of encoded data slices substantially includes a corresponding data segment and may select other encoded data slices of each set of encoded data slices. For instance, the inbound DST processing section 82 randomly selects the other encoded data slices. As a specific example, the inbound DST processing section 82 selects encoded data slices 1-12 when encoded data slices 1-10 includes the first decode threshold number of encoded data slices, the read threshold is 12, and the IDA width is 16.

Having selected the read threshold number of encoded data slices of each set of encoded data slices, the inbound DST processing section 82 can issue, via the network 24, a read threshold number of read slice requests to the DST execution unit set, where the read threshold number of read slice requests includes identities of the selected read threshold number of encoded data slices. The issuing can include generating the read threshold number of read slice requests and sending, via the network 24, the read threshold number of read slice requests to a corresponding read threshold number of DST execution units in accordance with a desired receive order priority. The desired receive order priority can indicate an ordering of subsequent receiving of read slice responses that includes encoded data slices. For example, the receive order priority indicates to receive encoded data slice 2 after encoded data slice 1, to receive encoded data slice 3 after encoded data slice 2, to receive encoded data slice 4 after encoded data slice 3, etc. for the first decode threshold number of encoded data slices such that a corresponding data segment is received in order. As a specific example, inbound DST processing section 82 sends a first read slice request to DST execution unit 1 to recover encoded data slice 1, followed by sending a second read slice requests to DST execution unit 2 to recover encoded data slice 2 subsequent to receiving of encoded data slice 1, etc.

Having issued the read threshold number of read slice requests, for each data segment, the inbound DST processing section 82 can receive one or more encoded data slices of the selected read threshold number of encoded data slices. The de-grouping 180 can initiate outputting of a next encoded data slice when a previous encoded data slice, if any, has already been outputted. For example, as the read slice responses are received that includes the one or more encoded data slices, the de-grouping 180 outputs received slices to the output module in accordance with the desired receive order priority. For instance, the de-grouping 180 receives the encoded data slice 1 and outputs the received encoded data slice 1 to the output module, receives, within a response timeframe, the encoded data slice 2 and outputs the received encoded data slice 2 to the output module, etc. while receiving encoded data slices substantially in order and within a response timeframe of each other.

When not receiving the next encoded data slice within the response time frame (e.g., a DST execution unit is unavailable, a read slice response has been significantly delayed), the de-grouping 180 can facilitate receiving of another decode threshold number of encoded data slices of the set of encoded data slices for the corresponding data segment. For example, the de-grouping 180 continues to receive encoded data slices. As another example, the de-grouping 180 facilitates issuing further read slice requests and receives further read slice responses that includes other encoded data slices of the other decode threshold number of encoded data slices.

Having received the other decode threshold number of encoded data slices, the de-grouping 180 can output the other decode threshold number of encoded data slices as threshold slices to the DS error decoding 182. The DS error decoding 182 disperse storage error decodes the other decode threshold number of encoded data slices to produce recovered slices, where the recovered slices includes at least a recovered next encoded data slices and at most a set of encoded data slices corresponding to the data segment. The output module can output one or more of the received slices and the recovered slices in accordance with the desired receive order priority as the recovered data.

Figure 11:
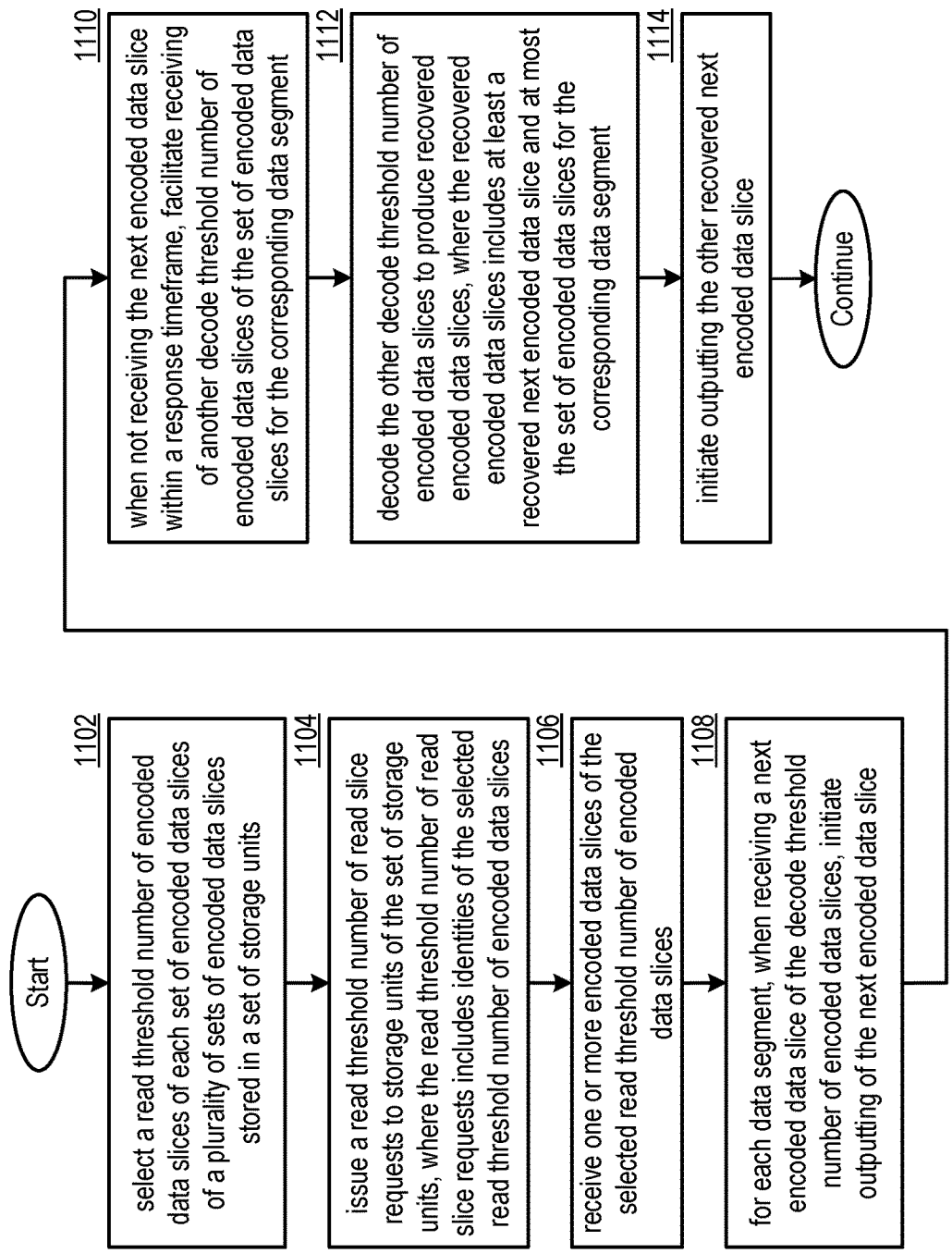
FIG. 11 is a logic diagram of an example of a method of recovering data in accordance with the present invention.

FIG. 11 is a flowchart illustrating an example of recovering data. In particular, a method is presented for use in association with one or more functions and features described in conjunction with FIGS. 1-10, for execution by a dispersed storage and task (DST) client module that includes a processor or via another processing system of a dispersed storage network that includes at least one processor and memory that stores instruction that configure the processor or processors to perform the steps described below.

The method begins at step 1102, where a processing system (e.g., of a distributed storage and task (DST) client module) selects a read threshold number of encoded data slices of each set of encoded data slices of a plurality of sets of encoded data slices stored in a set of storage units. For example, the processing system determines slice names corresponding to a decode threshold number of encoded data slices that corresponds to a data segment that was encoded to produce a set of encoded data slices.

The method continues at step 1104, where the processing system issues a read threshold number of read slice requests to storage units of the set of storage units, where the read threshold number of read slice requests includes identities of the selected read threshold number of encoded data slices. The issuing may include sending the read threshold number of read slice requests in accordance with a desired order of receiving, for example, in accordance with a slice ordering of the slices in the consecutive data of the data segment. The method continues at step 1106, where the processing system receives one or more encoded data slices of the selected read threshold number of encoded data slices.

For each data segment, when receiving a next encoded data slice of the decode threshold number of encoded data slices (e.g., in the desired order of receiving), the method continues at step 1108, where the processing system initiates outputting of the next encoded data slice. The outputting includes sending the next encoded data slice to a requesting entity, where the sending is in accordance with a desired outputting order. The desired outputting order includes at least one of the desired order of receiving and an ordering of a decode threshold number of encoded data slices that corresponds to an order of a responding encoded data slice.

When not receiving the next encoded data system within a response timeframe, the method continues at step 1110, where the processing system facilitates receiving of another decode threshold number of encoded data slices of the set of encoded data slices for the corresponding data segment. The other decode threshold number of encoded data slices may include one or more encoded data slices of the selected read threshold number of encoded data slices. The facilitating includes receive more encoded data slices of the selected read threshold number of encoded data slices and issuing one or more additional read slice requests for other encoded data slices of the set of encoded data slices.

The method continues at step 1112, where the processing system decodes the other decode threshold number of encoded data slices to produce recovered encoded data slices, where the recovered encoded data slices includes at least a recovered next encoded data slices and at most the set of encoded data slices for the corresponding data segment. For example, the processing system disperse storage error decodes any decode threshold number of encoded data slices of the set of encoded data slices to reproduce the data segment, where the reproduced data segment includes a reproduced set of encoded data slices. The method continues at step 1114 where the processing system initiates outputting the other recovered next encoded data slice. For example, the processing system outputs a corresponding recovered encoded data slice of the reproduced set of encoded data slices, where the recovered encoded data slices associated with the next encoded data slice.

In various embodiments, a non-transitory computer readable storage medium includes at least one memory section that stores operational instructions that, when executed by a processing system of a dispersed storage network (DSN) that includes a processor and a memory, causes the processing system to determine a selected read threshold number of encoded slices of each set of encoded slices of a plurality of sets of encoded slices stored in a set of storage units, where each set of the a plurality of sets of encoded slices corresponds to one of a plurality of data segments. A read threshold number of read slice requests are issued to storage units of the set of storage units, where the read threshold number of read slice requests includes identities of the selected read threshold number of encoded slices. One or more encoded slices of the selected read threshold number of encoded slices are received. For each data segment of the plurality of data segments, when a next encoded data slice of a decode threshold number of encoded data slices is received within a response timeframe, outputting of the next encoded data slice is initiated. When the next encoded data slice is not received within the response timeframe, receiving of another decode threshold number of encoded slices of the set of encoded slices for a corresponding data segment of the plurality of data segments is facilitated. The other decode threshold number of encoded slices are decoded to produce recovered encoded data slices, where the recovered encoded data slices includes at least a recovered next encoded data slice and at most the set of encoded slices for the corresponding data segment. Outputting the recovered next encoded data slice is initiated.

In various embodiments, each data segment of the plurality of data segments was dispersed storage error encoded to produce a corresponding set of encoded slices of the plurality of sets of encoded slices. In various embodiments, the set of encoded slices for the corresponding data segment includes a first subset of encoded data slices and includes a second subset of encoded code slices. The first subset and the second subset are mutually exclusive and collectively exhaustive with respect to the set of encoded slices, and at least one of the other decode threshold number of encoded slices is an encoded code slice of the second subset. In various embodiments, a size of the first subset corresponds the decode threshold number. In various embodiments, the selected read threshold number of encoded slices is determined by selecting an entirety of the first subset to be included in the selected read threshold number of encoded slices.

In various embodiments, the other decode threshold number of encoded slices of the set of encoded slices is determined based on determining a subset of the set of encoded slices that have already been received. A number of necessary remaining slices is determined based on subtracting a size of the subset from the decode threshold number. A set of additional requests is generated for transmission to the storage units of the set of storage units. A number of additional requests of the set is equal to the number of necessary remaining slices, and the set of additional requests indicate encoded code slices of the second subset. In various embodiments, no additional requests are transmitted to the storage units of the set of storage units in response to number of necessary remaining slices being determined to be equal to zero, and the other decode threshold number of encoded slices are selected from the a subset of the set of encoded slices that have already been received.

In various embodiments, outputting of each next encoded data slice is in accordance with a data slice ordering, and the data slice ordering is based on consecutive data of the corresponding data segment. In various embodiments, an out-of-order encoded data slice of the decode threshold number of encoded slices is received. The out-of-order encoded data slice is temporarily stored in local cache in response to determining the out-of-order encoded data slice does not correspond to the next encoded data slice of the data slice ordering, and in response to determining the next encoded data slice has not yet been received. It is determined that the out-of-order encoded data slice corresponds to a subsequent next encoded data slice of the data slice ordering in response to subsequently receiving and outputting the next encoded data slice. The out-of-order encoded data slice is retrieved from the local cache in response to determining the out-of-order encoded data slice corresponds to the subsequent next encoded data slice, and outputting the out-of-order encoded data slice is initiated.

In various embodiments, the read threshold number of read slice requests to storage units are transmitted consecutively at a corresponding plurality of different times in an order corresponding to the data slice ordering. In various embodiments, outputting each next encoded data slice includes transmitting the each next encoded data slice to a requesting entity in accordance with the data slice ordering, and the requesting entity reproduces the corresponding data segment in response to receiving the entirety of the decode threshold number of encoded data slices in accordance with the data slice ordering, by utilizing the decode threshold number of encoded data slices.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%).

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing system", "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing system, and/or processing unit may be, or further include, memory and/or an integrated memory element, which may be a single memory device, a plurality of memory devices, and/or embedded circuitry of another processing module, module, processing circuit, processing system, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing system, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing system, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing system, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
   issuing a read threshold number of read slice requests to storage units of a set of storage units, where the read threshold number of read slice requests identifies a read threshold number of encoded slices of a set of encoded slices corresponding to a data segment;
   when one or more other encoded data slices of the read threshold number of encoded slices is not received within a time threshold, facilitating receiving a decode threshold number of encoded slices of the set of encoded slices;
   decoding the decode threshold number of encoded slices to produce recovered encoded data slices, wherein a number of the recovered encoded data slices corresponds to the read threshold number minus a number of the encoded slices received within the time threshold; and
   outputting the recovered encoded data slices and the encoded slices of the read threshold number of encoded slices received within the time threshold.

2. The method of claim 1, wherein the data segment was dispersed storage error encoded to produce the set of encoded slices.

3. The method of claim 1, wherein the set of encoded slices for the corresponding data segment includes a first subset of encoded data slices and includes a second subset of encoded code slices, wherein the first subset and the second subset are mutually exclusive and collectively exhaustive with respect to the set of encoded slices, wherein the encoded data slices received within response timeframe are elements of the first subset and wherein at least one of the recovered encoded data slices is an element of the second subset.

4. The method of claim 3, wherein a size of the first subset corresponds the decode threshold number.

5. The method of claim 3, further comprising determining a subset of the set of encoded slices received within the time threshold;
   determining a number of necessary remaining slices based on subtracting a size of the subset from the decode threshold number; and
   generating a set of additional requests for transmission to the storage units of the set of storage units, wherein a number of additional requests of the set is equal to the number of necessary remaining slices, and wherein the set of additional requests indicate encoded code slices of the second subset.

6. The method of claim 5, wherein no additional requests are transmitted to the storage units of the set of storage units in response to number of necessary remaining slices being determined to be equal to zero.

7. The method of claim 3, wherein the read threshold number of read slice requests is determined by selecting an entirety of the first subset to be included in the read threshold number of read slice requests.

8. The method of claim 1, wherein outputting of the recovered encoded data slices and the encoded slices of the read threshold number of encoded slices received within the time threshold is in accordance with a data slice ordering, and wherein the data slice ordering is based on consecutive data of the corresponding data segment.

9. The method of claim 8, wherein the read threshold number of read slice requests to storage units are transmitted consecutively at a corresponding plurality of different times in an order corresponding to the data slice ordering.

10. The method of claim 8, wherein a requesting entity reproduces the data segment in accordance with the data slice ordering.

11. A processing system comprises:
    at least one processor; and
    a memory that stores operational instructions, that when executed by the at least one processor, cause the processing system to perform operations that include:
    issuing a read threshold number of read slice requests to storage units of a set of storage units, where the read threshold number of read slice requests identifies a read threshold number of encoded slices of a set of encoded slices corresponding to a data segment;
    when one or more other encoded data slices of the read threshold number of encoded slices is not received within a time threshold, facilitating receiving a decode threshold number of encoded slices of the set of encoded slices;
    decoding the decode threshold number of encoded slices to produce recovered encoded data slices, wherein a number of the recovered encoded data slices corresponds to the read threshold number minus a number of the encoded slices received within the time threshold; and
    outputting the recovered encoded data slices and the encoded slices of the read threshold number of encoded slices received within the time threshold.

12. The processing system of claim 11, wherein the data segment was dispersed storage error encoded to produce the set of encoded slices.

13. The processing system of claim 11, wherein the set of encoded slices for the corresponding data segment includes a first subset of encoded data slices and includes a second subset of encoded code slices, wherein the first subset and the second subset are mutually exclusive and collectively exhaustive with respect to the set of encoded slices, wherein the encoded data slices received within response timeframe are elements of the first subset and wherein at least one of the recovered encoded data slices is an element of the second subset.

14. The processing system of claim 13, wherein a size of the first subset corresponds the decode threshold number.

15. The processing system of claim 13, wherein the operations further include:
    determining a subset of the set of encoded slices received within the time threshold;
    determining a number of necessary remaining slices based on subtracting a size of the subset from the decode threshold number; and
    generating a set of additional requests for transmission to the storage units of the set of storage units, wherein a number of additional requests of the set is equal to the number of necessary remaining slices, and wherein the set of additional requests indicate encoded code slices of the second subset.

16. The processing system of claim 15, wherein no additional requests are transmitted to the storage units of the set of storage units in response to number of necessary remaining slices being determined to be equal to zero.

17. The processing system of claim 13, wherein the read threshold number of read slice requests is determined by selecting an entirety of the first subset to be included in the read threshold number of read slice requests.

18. The processing system of claim 11, wherein outputting of the recovered encoded data slices and the encoded slices of the read threshold number of encoded slices received within the time threshold is in accordance with a data slice ordering, and wherein the data slice ordering is based on consecutive data of the corresponding data segment.

19. The processing system of claim 18, wherein the read threshold number of read slice requests to storage units are transmitted consecutively at a corresponding plurality of different times in an order corresponding to the data slice ordering.

20. The processing system of claim 18, wherein a requesting entity reproduces the data segment in accordance with the data slice ordering.

\* \* \* \* \*